United States Patent Office 3,355,651
Patented Nov. 28, 1967

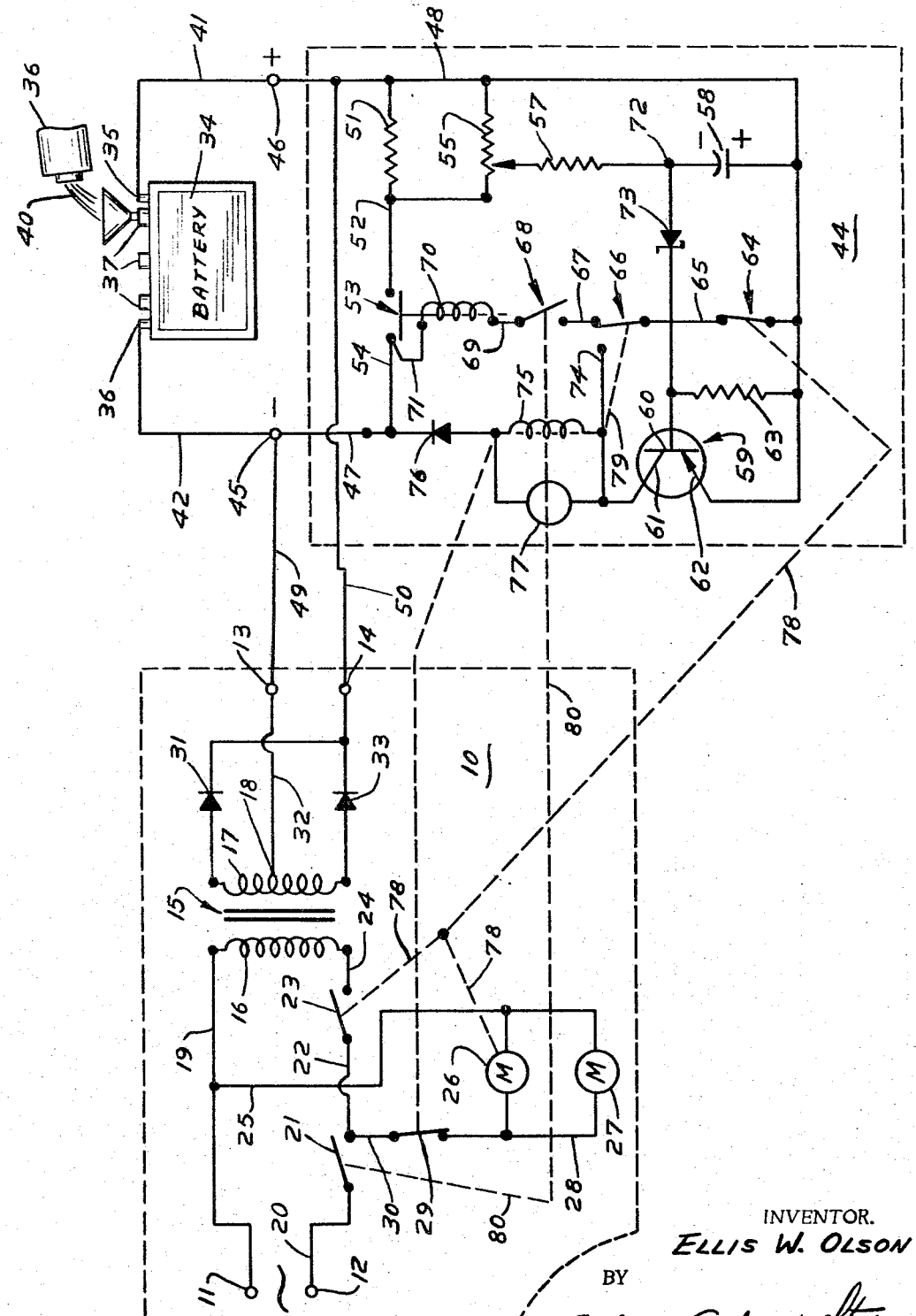

3,355,651
BATTERY ACTIVATOR
Ellis W. Olson, Mankato, Minn., assignor, by mesne assignments, to Introl Corporation, a corporation of Minnesota
Filed Mar. 11, 1964, Ser. No. 351,034
4 Claims. (Cl. 320—31)

This invention relates generally to storage batteries and is more particularly directed to a method and apparatus for activating or conditioning storage batteries of the class which are stored, after manufacture and prior to use, without an electrolyte solution, as is necessary for operation of the storage battery within the cells of the battery.

In the prior art with which my invention is concerned, a recent development has led to the provision and distribution of lead peroxide type storage batteries without any suitable electrolyte present in any of the individual cells which are comprised generally of a chamber in which is immersed a plurality of lead grids containing a paste of lead peroxide material and are constructed according to principles well known in the art. The distribution of such batteries, also known as dry charge batteries, without the electrolyte in the individual cells has solved a great number of shipping problems along with a number of storage problems which had troubled the industry for a long time. Solution in this manner of the problems associated with the distribution of "wet" storage batteries shipped with a suitable electrolyte, such as sulphuric acid, in the individual cells has given rise to a further problem which, while not as troublesome as the earlier problems concerning the distribution of "wet" storage batteries, has proven difficult to the industry as evidenced by the number of batteries which are returned after installation and operation. Upon becoming familiar with the principles of my invention, it may be seen that a method may be followed in initially activating or conditioning batteries of the class under consideration which will either provide a battery that will perform satisfactorily under operating conditions or provide a reliable indication of the fact that the battery is defective because of manufacturing and/or mechanical deficiencies and should not therefore be installed or placed in service.

The problem of malfunctioning batteries is believed caused by lead oxide formed on the lead grids in the storage battery during storage and prior to the introduction of a suitable electrolyte and has resulted in premature and early failure of this class of electrical storage batteries.

As will become apparent from a consideration of the drawings and description set forth below, my invention is concerned with a method of conditioning or activating electrical storage batteries after an electrolyte has been added. The method is comprised of the alternate application of heat to initiate and maintain a chemical reaction between the electrolyte and the lead oxide to destroy or remove the coating from the lead grids in the storage battery and then testing the battery under load to determine the ability of the particular battery to perform under predetermined operating conditions. The alternate heating and application of a load to the battery is continued for a period of time sufficient to determine whether or not the particular battery being conditioned or activated will either perform satisfactorily under operating conditions or is defective and incapable of being conditioned or activated for operational service. My invention is also concerned with apparatus for practicing the method set forth above and further includes apparatus for determining the condition of a battery by comparison of the output of a battery under load conditions with a predetermined standard.

It is therefore an object of my invention to provide a novel method of activating the dry charged class of storage batteries after an electrolyte has been added to the battery.

Another object of my invention is to provide a novel apparatus for automatically activating storage batteries of the class with which this invention is concerned.

A further object of my invention is to provide improved apparatus for testing the condition of a storage battery such as the dry charged class of storage batteries after an electrolyte has been added to place the battery in operative condition.

These and other objects of my invention will become apparent from a consideration of the appended specification, claims and drawing in which an operative embodiment of apparatus for automatically practicing my method of activating dry charged storage batteries is shown in schematic and diagrammatic form.

Referring now to the drawing, there is shown generally a source of unidirectional current pulses 10, a controller 44 connected thereto and having a pair of output terminals 45 and 46 connected to a battery 34 which is shown in the process of being activated by the addition of a suitable electrolyte to a plurality of separate cells therein.

Source of unidirectional current pulses 10 includes a pair of input terminals 11 and 12 adapted for connection to a suitable source of alternating current (not shown) that are connected to primary winding 16 on a suitable transformer 15 through conductors 19 and 20, normally open switch means 21, conductor 22, normally open switch means 23 and conductor 24 respectively.

A timing switch motor 26, adapted to sequentially actuate switch means 23 and a further switch means 64 through suitable driving means 78, and a fan motor 27 are shown connected at their right-hand ends to conductor 25 connected to conductor 19 and at their left-hand ends to conductor 22 through conductor 28, switch means 29 and conductor 30. Motors 26 and 27 and their associated apparatus may be comprised of devices commonly available and utilized by those skilled in the art in the fabrication and design of battery charging apparatus.

Secondary winding 17 on transformer 15 is provided with a center tap 18 connected to terminal 13 through conductor 32 and the extremities are connected to terminal 14 through asymmetrical current conducting devices 31 and 33 respectively. An output comprised of unidirectional pulses of electrical energy will appear across terminals 13 and 14 when switch means 21 and switch means 23 are closed to complete a circuit to primary winding 16 on transformer 15.

Controller 44 is provided with a pair of output terminals 45 and 46 which are adapted for connection to a battery and which are connected to terminals 13 and 14 through conductors 49 and 50 respectively. A load device comprised of parallel connected resistors 51 and 55 is shown connected intermediate conductors 48 and 47 through a circuit including conductor 52, switching means 53 associated with relay winding 70 and conductor 54. Load resistor 55 includes a wiper 56 that is also connected to conductor 48 through resistor 57, terminal 72 and capacitor 58. Relay winding 70 is connected to conductor 47 through conductor 71 and conductor 54 and to conductor 48 through conductor 69, switch means 68, conductor 67, switch means 66, conductor 65 and switch means 64.

A semi-conductor current controlling device shown in the form of transistor 59 having base, collector and emitter electrodes 60, 61 nd 62 respectively is connected intermediate conductors 47 and 48 through asymmetrical current conducting device 76, relay winding 75, having indicator lamp 77 connected in parallel therewith, conductor 74, collector electrode 61 and emitter electrode 62 connected to conductor 48. Base electrode 60 on transistor 59 is connected to conductor 48 through resistor 63 and to terminal 72 through potential responsive asymmetrical current conducting device 73, shown in the form of a Zener diode. Conductor 74 connected to the lower end of relay winding 75 is also connected to a stationary contact associated with switch means 66.

Switch means 68 and switch means 21 are shown connected to common driving means 80 to be simultaneously actuated between open and closed positions. Relay winding 75 is shown operatively connected to driving means 79 to, when energized, actuate switch means 29 from a closed to an open position and switch means 66 from the position shown in the drawing to conductive engagement with the stationary contact connected to conductor 74.

Battery 34 is a representation of the dry charged type of battery having negative and positive electrodes 35 and 36 and a plurality of cells, each having suitable access openings 37 through which a suitable electrolyte 40 may be added from a container 39 when it is desired to activate the battery for operational service. Electrode 35 is shown connected to output terminal 46 through conductor 41 and electrode 36 is shown connected to output terminal 45 through conductor 42.

Operation

In describing the method and apparatus for carrying out the principles of my invention, it will be assumed that battery 34 has been supplied with the proper amount of electrolyte 40 to each of the individual cells therein through filler members 37. Battery 34 may thus be in proper condition for operation or, as is more likely, the surface of the lead plates therein may be covered with a coating of lead oxide that may result in premature failure or malfunction of battery 34. The application of my method of alternately heating the electrolyte to initiate the chemical reduction of the lead oxide and of testing the battery under predetermined load conditions will indicate to an operator that the storage battery is either suitable for operation or is defective in which case it is discarded or returned to the manufacturer.

In the illustrated embodiment of apparatus for conditioning battery 34, terminals 11 and 12 on source of unidirectional current 10 are connected to a suitable source of alternating current. Switch means 21 and 68 are simultaneously actuated through driving means 80 from the normally open position shown in the drawing to a closed position to complete a circuit for energizing primary winding 16 on transformer 15 and timer motor 26 and fan motor 27. Timer motor 27 is adapted to actuate switch means 23 and 64 through driving means 78 whereby switch means 23 and 64 are alternately and successively actuated between open and closed positions and it may be apparent to those skilled in the art that the time for a complete cycle of operation and the portions of the cycle of operation during which switch means 23 or 64 are closed may be varied and the length of the time intervals may easily be determined upon become familiar with the principles of my invention. Assuming during the first portion of a complete time interval that switch means 23 is closed and switch means 64 is open, output terminals 13 and 14 on source 10 are energized with pulses of unidirectional electrical energy and battery 34 is energized therefrom through output terminals 45 and 46 and conductors 49 and 50. The magnitude of the current supplied to battery 34 should be sufficient to cause a rise in temperature of electrolyte 40 to accelerate the chemical reaction which results in the chemical reduction and removal of the lead oxide on the surface of the battery plates.

After a predetermined time interval, timing motor 26 will, through driving means 78, open switch means 23 to de-energize source 10 and close switch means 64 to complete a circuit for energizing relay winding 70 from conductor 48 through switch means 64, conductor 65, switch means 66, conductor 67, switch means 68, conductor 69, coil winding 70, conductor 71 and conductor 47 connected to output terminal 45. Energization of coil winding 70 serves to actuate switch means 53 whereby a circuit is completed from output terminal 46 to output terminal 45 through conductor 48, resistor 51 having resistor 55 connected in parallel therewith, conductor 52, switch means 53, conductor 54 and conductor 47 connected to terminal 45. This provides a load of suitable magnitude across terminals 35 and 36 of battery 34. The flow of current through resistor 55 connected in parallel with resistor 51, results in a potential of a magnitude dependent upon the magnitude of the current to appear at wiper 56 connected to terminal 72 through resistor 57. Initially, the potential results in a current flow to capacitor 58 which is gradually charged so that the potential at terminal 72 gradually approaches that of wiper 56. Potential responsive asymmetrical current conducting device 73, shown in the form of a Zener diode, will become operative in response to a potential in excess of a predetermined magnitude, dependent upon its characteristics, to conduct a current from wiper 56, through resistor 57, asymmetrical current conducting device 73 and resistor 63 to conductor 48. The differential in potential across emitter 62 and base 60 of transistor 59 will be sufficient to initiate a current flow and thereby render transistor 59 conductive to provide a current flow from emitter 62 to output terminal 45 through collector 61, conductor 74, relay winding 75 having indicator means 77 connected in parallel therewith, asymmetrical current conducting device 76 and conductor 47. Energization of relay winding 75 serves to simultaneously actuate switching means 29 and 66. Actuation of switch means 29 to an open position serves to de-energize timer motor 26 and fan motor 27 and since switch means 23 is in an open position during this portion of the cycle of operation, output terminals 13 and 14 on source 10 remain de-energized. Actuation of switch means 66 serves to open the circuit for energizing relay winding 70 and battery 34 is disconnected from the load resistors 51 and 55 and relay winding 75 is maintained in an energized state from conductor 48 through switch means 64 which is closed during the interval of the cycle under consideration, conductor 65, switch means 63, conductor 74, relay winding 75, asymmetrical current conducting device 76 and conductor 47 connected to output terminal 45.

It may now be apparent to those skilled in the art that the apparatus shown in the drawing may provide a plurality of complete cycles of operation, each of which is comprised of a first timed interval during which a substantial current is supplied to battery 34 to heat the electrolyte to initiate and accelerate the removal of the lead oxide coating from the battery plates and a second timed interval during which the current from source 10 is not supplied to battery 34 and a test phase is conducted during which a load of suitable value is connected to battery 34 and, after a suitable time delay, a determination of the potential of the battery under load is made. If a comparison of this potential with a predetermined value is satisfactory, the apparatus is de-energized and an indication of the operational status of battery 34 is provided to indicate to an operator that the battery is satisfactory and may be placed in operation. Additional means (not shown) which may take the form of suitable timing apparatus may be utilized to de-energize the apparatus after a predetermined number of cycles of operation have occurred to de-energize source 10 and to indicate to an operator that battery 34 is unsuitable for operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for conditioning storage batteries of the class above described comprising in combination; a source of unidirectional electrical energy; a pair of output terminals adapted to be connected to a storage battery to be conditioned for operation; battery condition determining means, including load means, potential responsive switching means and circuit means, including time delay means, connecting said load means to said potential responsive switching means; timing means operative to alternately and successively connect said source of energy and said battery condition determining means to said output terminals; and means connecting the potential responsive switching means in said battery condition determining means in current controlling relationship with said source of energy and said timing means whereby said timing means and said source of energy are de-energized when the potential of a battery exceeds a predetermined value.

2. The apparatus of claim 1 in which indicating means are connected to the potential responsive switching means, said indicating means being adapted to provide an indication to an operator of the condition of a battery.

3. The apparatus of claim 1 in which the potential responsive switching means is a Zener diode.

4. Storage battery condition testing apparatus comprising in combination; a pair of terminals adapted for connection to a battery to be tested; load means connected intermediate said terminals; indicating means responsive to the potential across said load means and adapted to be connected in parallel with said load means; and circuit means, including time delay means, connecting said indicating means to said load means, said time delay means being operative at a predetermined time after said terminals have been connected to a battery to be tested.

References Cited

UNITED STATES PATENTS

| | | | |
|---|---|---|---|
| 2,442,380 | 6/1948 | Schrodt et al. | 136—161 |
| 2,621,231 | 12/1952 | Medlar et al. | 320—48 X |
| 2,689,322 | 9/1954 | Godshalk et al. | 136—161 X |
| 3,129,373 | 4/1964 | Godshalk et al. | 320—25 |
| 3,160,805 | 12/1964 | Lawson | 320—39 |
| 3,173,073 | 3/1965 | Hetzler et al. | 320—48 |
| 3,176,210 | 3/1965 | Bethke | 320—48 X |
| 3,252,070 | 5/1966 | Medlar et al. | 320—21 |
| 3,281,638 | 10/1966 | Crawford | 320—40 |

JOHN F. COUCH, *Primary Examiner.*

S. WEINBERG, *Assistant Examiner.*